Patented Aug. 21, 1951

2,564,664

UNITED STATES PATENT OFFICE 2,564,664

INSECT REPELLENTS

Paul D. Bartlett, Weston, Mass., and Hyp J. Dauben, Jr., Seattle, Wash., assignors to the United States of America as represented by the Secretary of the Army No Drawing. Application January 7, 1949, Serial No. 69,833

13 Claims. (Cl. 167—22)

This invention relates to insect repellents.

We have found that the application of hydroxy citronellal, a compound having the structural formula

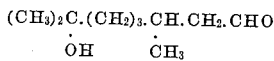

or hydroxy citronellal dimethyl acetal, a compound having the structural formula

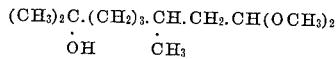

to the human skin or to a fabric affords effective protection against insect bites, by repelling insects, particularly Aedes aegypti and Anopheles quadrimaculatus.

A number of tests to measure the repellency of hydroxy citronellal and hydroxy citronellal dimethyl acetal against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of hydroxy citronellal or hydroxy citronellal dimethyl acetal impregnated fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of hydroxy citronellal affords protection against Aedes aegypti for an average of 258 minutes. Against Anopheles quadrimaculatus, an average repellency time of 68 minutes was noted in analogous tests.

It was found that the application of hydroxy citronellal dimethyl acetal affords protection against Aedes aegypti for an average of 218 minutes. Against Anopheles quadrimaculatus, an average repellency time of 45 minutes was noted in analogous tests.

It was found that fabric impregnated with hydroxy citronellal remained repellent against Aedes aegypti for over 10 successive days.

It was found that fabric impregnated with hydroxy citronellal dimethyl acetal remained repellent against Aedes aegypti for over 10 successive days.

For ease of application to the skin, the hydroxy citronellal or hydroxy citronellal dimethyl acetal may be incorporated in a suitable inert liquid or solid non-toxic carrier which is non-injurious to the skin such as mineral oil, alcohol, petrolatum, etc. For ease and uniformity of application to the fabric, the hydroxy citronellal or hydroxy citronellal dimethyl acetal may be applied to the fabric in an inert non-toxic solvent which is non-injurious to the fabric, such as alcohol, ether, etc.

Having thus described our invention, we claim:

1. An insect repellent composition comprising a compound selected from the group consisting of hydroxy citronellal and hydroxy citronellal dimethyl acetal in a non-toxic, non-gaseous inert organic carrier which is non-injurious to the human skin and to fabric.

2. An insect repellent composition comprising a compound selected from the group consisting of hydroxy citronellal and hydroxy citronellal dimethyl acetal, in alcohol.

3. An insect repellent composition comprising a compound selected from the group consisting of hydroxy citronellal and hydroxy citronellal dimethyl acetal, in ether.

4. An insect repellent composition comprising a compound selected from the group consisting of hydroxy citronellal and hydroxy citronellal dimethyl acetal, in oil.

5. An insect repellent composition comprising a compound selected from the group consisting of hydroxy citronellal and hydroxy citronellal dimethyl acetal, in petrolatum.

6. An insect-repellent composition comprising hydroxy citronellal in an inert non-gaseous organic non-toxic carrier which is non-injurious to the human skin and to fabric.

7. An insect-repellent composition comprising hydroxy citronellal dimethyl acetal in an inert non-gaseous organic non-toxic carrier which is non-injurious to the human skin and to fabric.

8. An insect-repellent fabric comprising fabric impregnated with a compound selected from the group consisting of hydroxy citronellal and hydroxy citranellal dimethyl acetal.

9. An insect-repellent fabric comprising fabric impregnated with hydroxy citronellal.

10. An insect-repellent fabric comprising fabric impregnated with hydroxy citronellal dimethyl acetal.

11. A process of repelling insects comprising applying to the region from which the insects are to be repelled a compound being a member of the group consisting of hydroxy citronellal and hydroxy citronellal dimethyl acetal.

12. A process of repelling insects comprising applying hydroxy citronellal to the region from which the insects are to be repelled.

13. A process of repelling insects comprising applying hydroxy citronellal dimethyl acetal to the region from which the insects are to be repelled.

PAUL D. BARTLETT.
HYP J. DAUBEN, JR.

REFERENCES CITED

The following references are of record in the file of this patent:

UNITED STATES PATENTS

| Number | Name | Date |
|---|---|---|
| 2,306,332 | Flisik et al. | Dec. 22, 1942 |
| 2,400,006 | Jones et al. | May 7, 1946 |

OTHER REFERENCES

OSRD, Nat'l. Research Council, Insect Control Committee Report No. 167, Final Report May 1944, to Oct. 31, 1945, page 54, 0-5029, Citronellal, 1,3-butylene glycol acetal.

OSRD Insect Control Committee Report No. 16, Interim Report No. 0-87, Feb. 1,1 945. Particularly page 81, 0-2038, citronellol.

U. S. Dept. Agr., Dept. Bulletin No. 1472, Chemotropic Tests With the Screw-Worm Fly, Washington, D. C., March 1927, particularly page 10, citral, citronellal.